(12) United States Patent
Kajita

(10) Patent No.: US 11,370,875 B2
(45) Date of Patent: Jun. 28, 2022

(54) URETHANE RESIN COMPOSITION

(71) Applicant: SEKISUI CHEMICAL CO., LTD., Osaka (JP)

(72) Inventor: Tomonori Kajita, Saitama (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 16/465,377

(22) PCT Filed: Dec. 8, 2017

(86) PCT No.: PCT/JP2017/044201
§ 371 (c)(1),
(2) Date: May 30, 2019

(87) PCT Pub. No.: WO2018/105730
PCT Pub. Date: Jun. 14, 2018

(65) Prior Publication Data
US 2020/0002458 A1 Jan. 2, 2020

(30) Foreign Application Priority Data
Dec. 8, 2016 (JP) .............................. JP2016-238783

(51) Int. Cl.
C08J 9/14 (2006.01)
C08L 75/04 (2006.01)
C08G 18/16 (2006.01)
C08G 18/38 (2006.01)
C08G 18/18 (2006.01)
C08G 18/72 (2006.01)
C08K 5/17 (2006.01)
C08G 101/00 (2006.01)

(52) U.S. Cl.
CPC ......... *C08G 18/3819* (2013.01); *C08G 18/16* (2013.01); *C08G 18/166* (2013.01); *C08G 18/18* (2013.01); *C08G 18/72* (2013.01); *C08J 9/146* (2013.01); *C08K 5/175* (2013.01); *C08L 75/04* (2013.01); *C08G 2101/00* (2013.01)

(58) Field of Classification Search
None
See application file for complete search history.

(56) References Cited

U.S. PATENT DOCUMENTS

| 4,040,992 A | 8/1977 | Bechara et al. |
| 5,321,050 A | 6/1994 | Morimoto et al. |
| 5,371,057 A | 12/1994 | Morimoto et al. |
| 5,550,168 A | 8/1996 | Nakamura et al. |
| 2007/0259983 A1 | 11/2007 | Burdeniuc et al. |
| 2008/0312351 A1 | 12/2008 | Burdeniuc et al. |
| 2009/0099274 A1 | 4/2009 | Van Der Puy et al. |
| 2012/0172476 A1 | 7/2012 | Costa et al. |
| 2012/0313035 A1 | 12/2012 | Williams et al. |
| 2013/0041048 A1 | 2/2013 | Chen et al. |
| 2015/0240023 A1 | 8/2015 | Hoffman et al. |
| 2016/0229945 A1 | 8/2016 | Burdeniuc |
| 2019/0136005 A1 | 5/2019 | Williams et al. |

FOREIGN PATENT DOCUMENTS

| CN | 104628978 | 5/2015 |
| CN | 104640895 | 5/2015 |
| CN | 104693393 | 6/2015 |
| CN | 106084163 | 11/2016 |
| JP | 52-17484 | 2/1977 |
| JP | 6-256448 | 9/1994 |
| JP | 7-157528 | 6/1995 |
| JP | 2000-169542 | 6/2000 |
| JP | 2000-230028 | 8/2000 |
| JP | 2004-339269 | 12/2004 |
| JP | 2007-308696 | 11/2007 |
| JP | 2008-308689 | 12/2008 |
| JP | 2013-504656 | 2/2013 |
| JP | 2013-525574 | 6/2013 |
| JP | 2014-506947 | 3/2014 |
| JP | 2014-517118 | 7/2014 |
| JP | 2015-533912 | 11/2015 |
| JP | 2016-124912 | 7/2016 |
| JP | 2016-188330 | 11/2016 |
| JP | 2016-190971 | 11/2016 |
| WO | 2011/084563 | 7/2011 |
| WO | 2014/066596 | 5/2014 |
| WO | 2016/162362 | 10/2016 |

OTHER PUBLICATIONS

Notice of Reasons for Refusal dated Aug. 20, 2019 in corresponding Japanese Patent Application No. 2017-566168, with Machine Translation.
Decision of Refusal dated Jan. 2, 2020 in corresponding Japanese Patent Application No. 2017-566168, with English-language translation.
International Search Report dated Mar. 6, 2018 in International (PCT) Application No. PCT/JP2017/044201.
Extended European Search Report dated Jul. 2, 2020 in corresponding European Patent Application No. 17879264.4.

*Primary Examiner* — Michael J Feely
(74) *Attorney, Agent, or Firm* — Wenderoth, Lind & Ponack, L.L.P.

(57) ABSTRACT

The present invention relates to a polyol composition for obtaining a polyurethane foam through a reaction with a polyisocyanate compound. The polyol composition comprises a polyol, a catalyst, a foam stabilizer, a foaming agent, and ammonium carboxylate, wherein the ammonium carboxylate has a quaternary ammonium cation as a cationic moiety, and a carboxylic acid anion represented by formula (1) as an anionic moiety.

9 Claims, No Drawings

URETHANE RESIN COMPOSITION

TECHNICAL FIELD

The present invention relates to a polyol composition for obtaining a polyurethane foam through a reaction with a polyisocyanate compound, a foamable polyurethane premix composition, a foamable polyurethane composition, and a polyurethane foam.

BACKGROUND ART

Urethane resin compositions, which have excellent insulation and adhesive properties, have been used as heat-insulating materials for buildings, such as housing complexes including condominium apartments, houses, school facilities, and commercial buildings.

CITATION LIST

Patent Literature

PTL 1: JP2000-230028A
PTL 2: JP2004-339269A
PTL 3: JP2000-169542A

SUMMARY OF INVENTION

Technical Problem

Spray application is one of the methods for obtaining urethane foams. During spray application, lateral extension occurs due to insufficient catalyst reaction, which unfortunately generates peeling at the interface between a resin and a substrate.

Hydrofluorocarbons (HFCs) had been widely used as foaming agents; however, the use of HFCs will be legally banned in Japan in 2020. As substitutes for HFCs, hydrofluoroolefins (HFOs) having a low global warming potential (GWP) have been actively used; however, their catalytic decomposition properties are problematic.

Catalysts can be divided into two main groups: amine-based catalysts, and metal salt catalysts. Although amine-based catalysts can remarkably reduce lateral extension, decomposition reaction between HFO and a catalyst proceeds. On the other hand, although metal salt catalysts reduce decomposition reaction between HFO and a catalyst, lateral extension is not sufficiently inhibited.

There have been no known formulations capable of reducing lateral extension and decomposition reaction with HFO.

Solution to Problem

The present inventors conducted various research to solve the above problem. As a result, they found that the problem can be solved by the use of ammonium carboxylate satisfying a specific structure. The present inventors further conducted extensive research to attain the present invention.

Specifically, the present invention includes the following embodiments.

Item 1
A polyol composition for obtaining a polyurethane foam through a reaction with a polyisocyanate compound,
the polyol composition comprising a polyol, a catalyst, a foam stabilizer, a foaming agent, and ammonium carboxylate, the ammonium carboxylate having, as a cationic moiety, a quaternary ammonium cation, and as an anionic moiety, a carboxylic acid anion represented by formula (1):

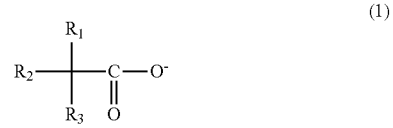

wherein $R_1$ is $C_nH_{2n+1}$; $R_2$ is $C_mH_{2m+1}$; $R_3$ is a hydrogen atom or $C_lH_{2l+1}$; and n, m, and l are each independently an integer of 1 or more.

Item 2
The polyol composition according to Item 1, wherein the amount of the ammonium carboxylate is 5 parts by mass or more per 100 parts by mass of the polyol.

Item 3
The polyol composition according to Item 1 or 2, wherein the amount of the ammonium carboxylate is 20 parts by mass or less per 100 parts by mass of the polyol.

Item 4
The polyol composition according to any one of Items 1 to 3, wherein $R_3$ is $C_lH_{2l+1}$.

Item 5
The polyol composition according to any one of Items 1 to 4, wherein the cationic moiety of the ammonium carboxylate is tetramethyl ammonium cation.

Item 6
The polyol composition according to any one of Items 1 to 5, wherein the anionic moiety of the ammonium carboxylate is 2,2-dimethylpropanoic acid anion.

Item 7
The polyol composition according to any one of Items 1 to 6, which comprises hydrofluoroolefin (HFO) as a foaming agent.

Item 8
The polyol composition according to Item 7, wherein the hydrofluoroolefin is E-1-chloro-3,3,3-trifluoro propene.

Item 9
A foamable polyurethane premix composition, which comprises separately the polyol composition according to any one of Items 1 to 8 and a polyisocyanate compound.

Item 10
A foamable polyurethane composition, which is a mixture of the polyol composition according to any one of Items 1 to 9 and a polyisocyanate compound.

Item 11
The foamable polyurethane composition according to Item 10, wherein the foamable polyurethane composition has an isocyanate index of 250 or more.

Item 12
A polyurethane foam obtained by curing the foamable polyurethane composition according to Item 10 or 11.

Item 13
The polyurethane foam according to Item 12, which is a molded article.

Advantageous Effects of Invention

The present invention provides a polyol composition, a foamable polyurethane premix composition, and a foamable urethane resin composition that are capable of reducing lateral extension and decomposition reaction with HFO.

DESCRIPTION OF EMBODIMENTS

The present invention encompasses the following:
(i) a polyol composition for obtaining a polyurethane foam by reacting the composition with a polyisocyanate compound, the composition comprising a polyol, catalyst, foam stabilizer, foaming agent, and predetermined ammonium carboxylate;
(ii) a polyurethane premix composition comprising separately the polyol composition and a polyisocyanate compound;
(iii) a foamable polyurethane composition, which is a mixture of the polyol composition and a polyisocyanate compound; and
(iv) a polyurethane foam obtained by curing the foamable polyurethane composition.

The polyol composition of the present invention contains a polyol compound, catalyst, foam stabilizer, foaming agent, and predetermined ammonium carboxylate, optionally with other components. Other components include, but are not limited to, a flame retardant.

The polyol composition is, for example, a solution or dispersion.

A polyisocyanate as the main component for a urethane resin and a polyol as a curing agent for a urethane resin undergo a chemical reaction and then cure, thereby forming a urethane resin.

The following describes each component.

1. Polyol

Examples of polyols as a curing agent for urethane resin include polylactone polyols, polycarbonate polyols, aromatic polyols, alicyclic polyols, aliphatic polyols, polyester polyols, polymeric polyols, polyether polyols, and the like.

Examples of polylactone polyols include polypropiolactone glycol, polycaprolactone glycol, polyvalerolactone glycol, and the like.

Examples of polycarbonate polyols include polyols obtained by dealcoholization reaction of a hydroxyl-containing compound, such as ethylene glycol, propylene glycol, butanediol, pentanediol, hexanediol, octanediol, or nonanediol, with diethylene carbonate or dipropylene carbonate.

Examples of aromatic polyols include bisphenol A, bisphenol F, phenol novolac, cresol novolac, and the like.

Examples of alicyclic polyols include cyclohexane diol, methylcyclohexane diol, isophorone diol, dicyclohexylmethane diol, dimethyldicyclohexylmethane diol, and the like.

Examples of aliphatic polyols include ethylene glycol, propylene glycol, butanediol, pentanediol, hexanediol, and the like.

Examples of polyester polyols include polymers obtained by dehydration condensation of a polybasic acid with a polyhydric alcohol; polymers obtained by ring-opening polymerization of a lactone; and condensation products of hydroxy carboxylic acids with polyhydric alcohols.

Specific examples of polybasic acids as used herein include adipic acid, azelaic acid, sebacic acid, terephthalic acid, isophthalic acid, succinic acid, and the like. Specific examples of polyhydric alcohols include bisphenol A, ethylene glycol, 1,2-propylene glycol, 1,4-butanediol, diethylene glycol, 1,6-hexane glycol, neopentyl glycol, and the like.

Specific examples of lactones include ε-caprolactone, α-methyl-ε-caprolactone, and the like.

Specific examples of hydroxy carboxylic acids include castor oil, reaction products of castor oil with ethylene glycol, and the like.

Examples of polymeric polyols include polymers obtained by graft polymerization of polyols with ethylenically unsaturated compounds; polybutadiene polyol; modified polyols of polyhydric alcohols; hydrogenated products thereof; and the like.

Examples of polyols in the polymers obtained by graft polymerization of polyols with ethylenically unsaturated compounds include aromatic polyols, alicyclic polyols, aliphatic polyols, polyester polyols, and the like. Examples of ethylenically unsaturated compounds in the polymers obtained by graft polymerization of polyols with ethylenically unsaturated compounds include acrylonitrile, styrene, methyl acrylate, methacrylate, and the like.

Examples of modified polyols of polyhydric alcohols include those obtained by reacting a polyhydric alcohol used as a starting material with an alkylene oxide to modify the alcohol.

Examples of polyhydric alcohols include trihydric alcohols, such as glycerin and trimethylolpropane; tetra- to octahydric alcohols, such as pentaerythritol, sorbitol, mannitol, sorbitan, diglycerol, dipentaerythritol, sucrose, glucose, mannose, fructose, methyl glucoside, and derivatives thereof; phenols, such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil polyols; multi-functional polyols (e.g., 2 to 100 functional groups), such as (co)polymers of hydroxyalkyl(meth)acrylate and polyvinyl alcohols; condensation products (novolak) of phenol with formaldehyde; and the like.

The method for modifying a polyhydric alcohol is not particularly limited. As such a method, a method for adding alkylene oxide ("AO") to a polyhydric alcohol is preferably used.

Examples of alkylene oxide ("AO") include AO having 2 to 6 carbon atoms, such as ethylene oxide ("EO"), 1,2-propylene oxide ("PO"), 1,3-propylene oxide, 1,2-butylene oxide, and 1,4-butylene oxide.

Of these, PO, EO, and 1,2-butylene oxide are preferable, and PO and EO are more preferable from the standpoint of their characteristics and reactivity. When two or more types of AOs (e.g., PO and EO) are used, they may be added by block addition, random addition, or a combination thereof.

Examples of polyether polyols include polymers obtained by subjecting at least one alkylene oxide to ring-opening polymerization in the presence of at least one member of, for example, low-molecular-weight active hydrogen compounds having two or more active hydrogen atoms.

Examples of low-molecular-weight active hydrogen compounds having two or more active hydrogen atoms include diols, such as bisphenol A, ethylene glycol, propylene glycol, butylene glycol, and 1,6-hexanediol; triols, such as glycerin and trimethylolpropane; and amines, such as ethylenediamine and butylenediamine. Examples of alkylene oxides subjected to ring-opening polymerization include ethylene oxide, propylene oxide, and tetrahydrofuran.

The polyol used in the present invention is preferably a polyester polyol or a polyether polyol, because they greatly contribute to the reduction of the gross calorific value at the time of combustion.

Of these, a polyester polyol having a molecular weight of 200 to 800 is more preferable for use, and a polyester polyol having a molecular weight of 300 to 500 is even more preferable for use.

2. Polyisocyanate Compound

Examples of the polyisocyanate compound, which is the main component of a urethane resin, include aromatic polyisocyanates, alicyclic polyisocyanates, aliphatic polyisocyanates, and the like.

Examples of aromatic polyisocyanates include phenylene diisocyanate, tolylene diisocyanate, xylylene diisocyanate, diphenyl methane diisocyanate, dimethyl diphenyl methane diisocyanate, triphenylmethane triisocyanate, naphthalene diisocyanate, polymethylene polyphenyl polyisocyanate, and the like.

Examples of alicyclic polyisocyanates include cyclohexylene diisocyanate, methyl cyclohexylene diisocyanate, isophorone diisocyanate, dicyclohexylmethane diisocyanate, dimethyl dicyclohexylmethane diisocyanate, and the like, Examples of aliphatic polyisocyanates include methylene diisocyanate, ethylene diisocyanate, propylene diisocyanate, tetramethylene diisocyanate, hexamethylene diisocyanate, and the like.

The polyisocyanate compounds may be used singly, or in a combination of two or more. The main component of a urethane resin is preferably an aromatic polyisocyanate, such as diphenyl methane diisocyanate, from the standpoint of, for example, convenience and availability.

The foamable polyurethane composition containing a polyol compound and an isocyanate compound according to the present invention preferably has an isocyanate index of 250 or more, more preferably 260 or more to 700 or less, and even more preferably 280 or more to 600 or less, and most preferably 300 or more to 500 or less.

The isocyanate index (INDEX) is calculated in accordance with the following method.

INDEX=the number of equivalents of isocyanates/
(the number of equivalents of a polyol+the
number of equivalents of water)×100

The number of equivalents of isocyanates=the number of parts of polyisocyanates used×NCO content (%)/100/the molecular weight of NCO The number of equivalents of a polyol=OHV×the number of parts of a polyol used/the molecular weight of KOH (OHV is the hydroxy value of the polyol: mg KOH/g).

The number of equivalents of water=the number of parts of water used×the number of OH groups in water/the molecular weight of water.

In the equation, the unit for the number of parts used is gram (weight), and the molecular weight of NCO groups is 42, with the NCO content indicating the ratio of NCO groups in a polyisocyanate compound by mass %. For convenience of unit conversion in the equation, the molecular weight of KOH is 56100, and the molecular weight of water is 18, with the number of OH groups in water being 2.

3. Ammonium Carboxylate

The composition of the present invention contains ammonium carboxylate. The cationic moiety of the ammonium carboxylate is a quaternary ammonium cation, and the anionic moiety of the ammonium carboxylate is the carboxylic acid anion represented by formula (1) below:

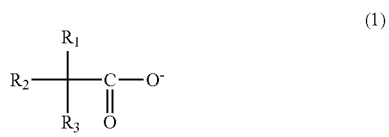

wherein $R_1$ is $C_nH_{2n+1}$; $R_2$ is $C_mH_{2m+1}$; $R_3$ is a hydrogen atom or $C_lH_{2l+1}$; and n, m, and l are each independently an integer of 1 or more, preferably an integer of 1 to 4, and more preferably an integer of 1 or 2.

$C_nH_{2n+1}$, $C_mH_{2m+1}$, and $C_lH_{2l+1}$ are each independently alkyl. Examples of alkyl include methyl, ethyl, n-propyl, isopropyl, sec-propyl, tert-propyl, butyl, hexyl, and the like.

In a preferable embodiment of the present invention, $R_3$ is $C_lH_{2l+1}$.

Examples of the quaternary ammonium cation, which is the cationic moiety of the ammonium carboxylate, include tetramethyl ammonium cation and triethyl methyl ammonium cation.

Examples of an carboxylic acid anion, which is the anionic moiety of the ammonium carboxylate, include 2,2-dimethylpropanoic acid anion and 2-ethylhexanoic acid anion.

The ammonium carboxylates can be used singly, or in a combination of two or more.

The amount of the ammonium carboxylate in the composition of the present invention is preferably 3 parts by mass or more, more preferably 5 parts by mass or more, and more preferably 7 parts by mass or more, per 100 parts by mass of the polyol. The amount of the ammonium carboxylate is preferably 23 parts by mass or less, more preferably 17 parts by mass or less, and even more preferably 1.2 parts by mass or less, per 100 parts by mass of the polyol.

The amount of the ammonium carboxylate is preferably 0.5 parts by mass or more, more preferably 1 part by mass or more, and even more preferably 2 parts by mass or more, per 100 parts by mass of the urethane resin. The amount of the ammonium carboxylate is preferably 6 parts by mass or less, more preferably 4 parts by mass or less, and even more preferably 3 parts by mass or less, per 100 parts by mass of the urethane resin.

When the amount of the ammonium carboxylate is the lower limit or over, a sufficient catalyst reaction can be expected, and an excellent foam can be formed. When the amount of the ammonium carboxylate is the upper limit or below, the difference in activity between the resinifying catalyst and the trimerization catalyst can be made small, thus inhibiting two-step foaming.

4. Catalyst

The resin composition of the present invention includes a catalyst. However, components corresponding to the "ammonium carboxylate" mentioned above are not included in the "catalyst." Specific examples of catalysts include resinifying catalysts and/or trimerization catalysts.

Resinifying catalysts are catalysts that facilitate reaction between an isocyanate and a polyol or the like. Of the resinifying catalysts, resinifying amine catalysts are catalysts having an amine structure, and resinifying metal catalysts are catalysts having metal or a metal salt.

Trimerization catalysts are catalysts in which isocyanates are reacted from one another to facilitate the generation of isocyanurate. Of the trimerization catalysts, trimerization amine catalysts are catalysts having an ammonium salt, and trimerization metal catalysts are catalysts having metal or a metal salt.

Examples of resinifying metal catalysts include metal salts containing lead, tin, bismuth, copper, zinc, cobalt, nickel, or the like. Organic acid metal salts containing lead, tin, bismuth, copper, zinc, cobalt, nickel, or the like are preferable. Dibutyltin dilaurate, dioctyltin dilaurate, dioctyltin versatate, bismuth trioctate, tin dioctylate, and lead dioctylate are more preferable.

Examples of resinifying amine catalysts include nitrogen-containing aromatic compounds, such as tris(dimethyl aminomethyl)phenol, 2,4-bis(dimethyl aminomethyl)phenol, and 2,4,6-tris(dialkylamino alkyl)hexahydro-S-triazine; tertiary ammonium salts, such as trimethyl ammonium salts, triethyl ammonium salts, and triphenyl ammonium salts; quaternary ammonium salts, such as tetramethyl ammonium salts, tetraethyl ammonium, and tetraphenyl ammonium salts; and the like.

Examples of trimerization metal catalysts include organic acid potassium, and preferably $C_{2-8}$ potassium carboxylate, such as potassium octylate, potassium acetate, potassium propionate, potassium butanate, and potassium benzoate.

The catalysts can be used singly, or in a combination of two or more.

The amount of the resinifying catalyst in the composition of the present invention is preferably 0.13 parts by mass to 7.5 parts by mass, more preferably 0.25 parts by mass to 3.8 parts by mass, even more preferably 0.4 parts by mass to 1.2 parts by mass, and most preferably 0.5 parts by mass to 1.0 part by mass, per 100 parts by mass of the polyol. The amount of the resinifying catalyst in the foamable polyurethane composition is 0.05 parts by mass to 2.0 parts by mass, preferably 0.1 parts by mass to 1.0 parts by mass, and more preferably 0.15 parts by mass to 0.30 parts by mass, per 100 parts by mass of the urethane resin.

When the amount of the resinifying catalyst is the lower limit or over, the resinifying reaction activates, which helps the trimerization activity by the heat in the resinifying reaction, and enables the formation of an excellent foam. When the amount of the resinifying catalyst is the upper limit or below, the difference in activity between the resinifying catalyst and the trimerization catalyst can be made small, thus inhibiting two-step foaming.

The amount of the trimerization catalyst in the composition of the present invention is preferably 1.3 parts by mass to 25.0 parts by mass, more preferably 2.5 parts by mass to 20.0 parts by mass, even more preferably 4.0 parts by mass to 14.0 parts by mass, and most preferably 5.5 parts by mass to 10.0 parts by mass, per 100 parts by mass of the polyol. The amount of the trimerization catalyst in the foamable polyurethane composition is 0.5 parts by mass to 6.5 parts by mass, preferably 1.0 part by mass to 5.0 parts by mass, and more preferably 1.5 parts by mass to 3.5 parts by mass, per 100 parts by mass of the urethane resin.

When the amount of the trimerization catalyst is the lower limit or over, sufficient trimerization catalyst effects can be expected, and an excellent foam can be formed. When the amount of the trimerization catalyst is the upper limit or below, the difference in activity between the resinifying catalyst and the trimerization catalyst can be made small, thus inhibiting two-step foaming.

5. Foam Stabilizer

Examples of foam stabilizers include surfactants, such as polyoxyalkylene foam stabilizers (e.g., polyoxyalkylene alkyl ether) and silicone foam stabilizers (e.g., organopolysiloxane).

In one example, the amount of the foam stabilizer is preferably 0.3 parts by mass to 38 parts by mass, per 100 parts by mass of the polyol. In the foamable polyurethane composition, the foam stabilizer is present in an amount of, for example, 0.1 parts by mass to 10 parts by mass, per 100 parts by mass of the urethane resin; however, the amount can be suitably determined, depending on the urethane resin.

The foam stabilizers may be used singly, or in a combination of two or more.

6. Foaming Agent

The foaming agent facilitates the formation of foam in a urethane resin. Examples of the foaming agent include water; hydrocarbons having a low boiling point, such as propane, butane, pentane, hexane, heptane, cyclopropane, cyclobutane, cyclopentane, cyclohexane, and cycloheptane; chlorinated aliphatic hydrocarbon compounds, such as dichloroethane, propyl chloride, isopropyl chloride, butyl chloride, isobutyl chloride, pentyl chloride, and isopentyl chloride; fluorine compounds, such as $CHF_3$, $CH_2F_2$, and $CH_3F$; hydrochlorofluorocarbon compounds, such as trichloromonofluoromethane, trichlorotrifluoroethane, dichloromonofluoroethane (e.g., HCFC141b (1,1-dichloro-1-fluoroethane), HCFC22 (chlorodifluoromethane), and HCFC142b (1-chloro-1,1-difluoroethane)); hydrofluorocarbons, such as HFC-245fa (1,1,1,3,3-pentafluoropropane) and HFC-365mfc (1,1,1,3,3-pentafluorobutane); hydrofluoroolefins, such as HFO-1233zd (E-1-chloro-3,3,3-trifluoropropene); ether compounds, such as diisopropyl ether; organic physical foaming agents, such as mixtures of these compounds; inorganic physical foaming agents, such as nitrogen gas, oxygen gas, argon gas, and carbon dioxide gas; and the like.

In order to form an excellent foam, it is preferable to contain hydrofluoroolefin (HFO) as a foaming agent.

The amount of the foaming agent is not particularly limited, and is preferably 0.3 parts by mass to 112 parts by mass, more preferably 0.3 parts by mass to 67 parts by mass, still more preferably 1.8 parts by mass to 67 parts by mass, and most preferably 3.7 parts by mass to 37 parts by mass, per 100 parts by mass of the polyol. In the foamable polyurethane composition, the foaming agent may be present in an amount of preferably 0.1 parts by mass to 30 parts by mass, more preferably 0.1 parts by mass to 18 parts by mass, still more preferably 0.5 parts by mass to 18 parts by mass, and most preferably 1 part by mass to 10 parts by mass, per 100 parts by mass of the urethane resin.

When the amount of the foaming agent is the lower limit or over, the formation of foam is facilitated, and the density of the resulting molded article can be reduced. When the amount of the foaming agent is the upper limit or below, the foam sufficiently foams; thus, an excellent foam can be obtained.

The foaming agents may be used singly, or in a combination of two or more.

7. Flame Retardant

The composition of the present invention may include a flame retardant in order to impart flame retardancy to the resulting foam. A suitably selected commercially available product can be used for the flame retardant.

The flame retardant preferably contains at least one member selected from red phosphorus, acicular fillers, bromine-containing flame retardants, phosphoric esters, phosphate-containing flame retardants, boron-containing flame retardants, antimony-containing flame retardants, and metal hydroxides.

Preferably, the flame retardant contains at least red phosphorus.

The red phosphorus for use in the present invention is not limited, and a suitably selected commercially available product can be used.

The amount of the red phosphorus used in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the red phosphorus may be present in an amount of preferably 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

When the amount of the red phosphorus is the lower limit or over, the self-extinguishing capability of the foam is maintained. When the amount of the red phosphorus is the upper limit or below, foaming of the foamable urethane composition is not impaired.

The boron-containing flame retardants include borax, boron oxides, boric acid, and borates.

Examples of boron oxides include diboron trioxide, boron trioxide, diboron dioxide, tetraboron trioxide, tetraboron pentoxide, and the like.

Examples of borates include borates of alkali metals, alkaline earth metals, elements that belong to group 4, group 12, and group 13 of the periodic table, and ammonium.

Specific examples of borates include alkali metal borates, such as lithium borate, sodium borate, potassium borate, and cesium borate; alkaline-earth metal borates, such as magnesium borate, calcium borate, and barium borate; zirconium borate; aluminum borate; ammonium borate; and the like.

A boron-containing flame retardant for use in the present invention is preferably borate.

The boron-containing flame retardants may be used singly, or in a combination of two or more.

The amount of the boron-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the boron-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin, The acicular filler may be an organic acicular filler or an inorganic acicular filler. The acicular filler is preferably an inorganic acicular filler. The aspect ratio of the acicular filler is 5 to 50, preferably 8 to 40, more preferably 10 to 40, even more preferably 10 to 35, and most preferably 8 to 25. The aspect ratio of the acicular filler used in this specification refers to a ratio of the maximum length of the filler to the minimum thickness (in the direction perpendicular to the maximum length) (also referred to as diameter/thickness ratio), which is confirmed through images obtained by observing the acicular filler under a scanning electron microscope. The aspect ratio of the acicular filler is based on the average of a sufficient number of fillers, i.e., the average of at least 250 acicular filler particles.

The acicular fillers have an average particle diameter of 0.1 μm or larger, but smaller than 15 μm, preferably 0.1 μm or more to 14 μm or less, and more preferably 0.3 to 10 μm. The average particle diameter can be determined by using an X-ray permeation-type sedimentation particle size distribution analyzer. The acicular filler has a melting point of 750° C. or more, preferably 800° C. or more, and more preferably 1,000° C. or more, Examples of acicular inorganic fillers include basic magnesium sulfate, aluminum borate, wollastonite, xonotlite, dawsonite, ellestadite, boehmite, rod-shaped hydroxyapatite, potassium titanate whisker, aluminum borate whisker, magnesium whisker, silicon whisker, acicular alumina, acicular ceramic, asbestos, acicular calcium carbonate, gypsum fibers, glass fibers, asbestos fibers, silica fibers, alumina fibers, silica-alumina fibers, zirconia fibers, carbon fibers (including fibrous or acicular new carbons such as carbon nanotubes, and spherical new carbons such as fullerene), graphite fibers, boron nitride fibers, boron fibers, metal fibers, and the like.

The acicular filler prevents at least either of shrinkage or deformation. In this specification, "shrinkage" refers to changes in length, including length in the length direction, length in the width direction, and length in the thickness direction. "Deformation" refers to changes in shape, such as warping, in particular, configuration changes in the thickness direction. Acicular means that the longest diameter is at least three times as long as the shortest diameter. Acicular fillers include so-called acicular fillers, as well as spindle-shaped fillers, cylindrical fillers, and the like.

In one embodiment of the present invention, the acicular filler is an acicular inorganic filler having an aspect ratio of 5 to 50; and an average particle diameter of 0.1 μm or larger, but smaller than 15 μm. The acicular filler is preferably wollastonite, or a potassium titanate whisker.

The amount of the acicular filler is preferably in the range of 2.5 parts by mass to 80 parts by mass, more preferably 2.5 parts by mass to 70 parts by mass, and even more preferably 5.5 parts by mass to 50 parts by mass, per 100 parts by mass of the polyol. In a foamable urethane resin composition, the amount of the acicular filler is 1 part by mass to 30 parts by mass, preferably 1 part by mass to 25 parts by mass, and more preferably 2 parts by mass to 18 parts by mass, per 100 parts by mass of the urethane resin.

The phosphoric esters for use in the present invention are not particularly limited, and are preferably monophosphoric esters, condensed phosphoric esters, and the like.

Examples of monophosphoric esters include, although are not particularly limited to, trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenylphosphate, xylenyl diphenylphosphate, diphenyl (2-ethylhexyl)phosphate, di (isopropylphenyl)phenylphosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresyl phosphine oxide, diphenyl methanephosphonate, diethyl phenyl phosphonate, resorcinol bis(diphenylphosphate), bisphenol A bis(diphenylphosphate), phosphaphenanthrene, tris(β-chloropropyl)phosphate, and the like.

The condensed phosphoric esters are not particularly limited. Examples of condensed phosphoric esters include trialkyl polyphosphate, resorcinol polyphenyl phosphate, resorcinol poly(di-2,6-xylyl)phosphate (produced by Daihachi Chemical Industry Co., Ltd., trade name PX-200), hydroquinonepoly(2,6-xylyl)phosphate, and condensation products thereof.

Examples of commercially available condensed phosphoric esters include resorcinol polyphenyl phosphate (trade name: CR-733S), bisphenol A polycresyl phosphate (trade name: CR-741), aromatic condensed phosphoric ester (trade name: CR747), resorcinol polyphenyl phosphate (produced by ADEKA Corporation, trade name: ADK STAB PFR), bisphenol A polycresyl phosphate (trade name: FP-600 and FP-700), and the like.

Of these, because of its effect in reducing the viscosity in the composition before curing and the initial heat amount, the use of a monophosphoric ester is preferable, and the use of tris(β-chloropropyl)phosphate is more preferable.

The phosphoric esters may be used singly, or in a combination of two or more.

The amount of the phosphoric ester is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the phosphoric ester may be present in an amount of preferably 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

When the amount of the phosphoric ester is the lower limit or over, the dense residue formed by the heat of a fire in a molded article formed from the foamable polyurethane composition is prevented from breaking. When the amount of the phosphoric ester is the upper limit or below, foaming of the formable polyurethane composition is not impaired.

The phosphate-containing flame retardants for use in the present invention contain phosphoric acid. The phosphoric acid portions used in phosphate-containing flame retardants are not particularly limited. Examples include a range of phosphoric acid, such as monophosphoric acid, pyrophosphoric acid, polyphosphoric acid, and combinations thereof.

Examples of phosphate-containing flame retardants include phosphates formed from a phosphoric acid and at least one metal or compound selected from metals that belong to group IA to IVB of the periodic table, ammonia, aliphatic amines, or aromatic amines. The metals that belong to group IA to IVB of the periodic table include lithium, sodium, calcium, barium, iron(II), iron(III), and aluminum.

The aliphatic amines include methyl amine, ethyl amine, diethyl amine, triethyl amine, ethylene diamine, and piperazine.

The aromatic amines include pyridine, triazine, melamine, and ammonium.

The phosphate-containing flame retardants may be subjected to a known waterproofness improvement treatment, such as a silane coupling agent treatment or coating treatment with melamine resin. A known foaming aid, such as melamine and pentaerythritol, may be added to the phosphate-containing flame retardants.

Specific examples of phosphate-containing flame retardants include monophosphates, pyrophosphates, and polyphosphates.

The monophosphates are not particularly limited, and examples include ammonium salts, such as ammonium phosphate, ammonium dihydrogenphosphate, and diammonium hydrogenphosphate; sodium salts, such as monosodium phosphate, disodium phosphate, trisodium phosphate, monosodium phosphite, disodium phosphite, and sodium hypophosphite; potassium salts, such as monopotassium phosphate, dipotassium phosphate, tripotassium phospahte, monopotassium phosphite, dipotassium phosphite, and potassium hypophosphite; lithium salts, such as monolithium phosphate, dilithium phosphate, trilithium phosphate, monolithium phosphite, dilithium phosphite, and lithium hypophosphite; barium salts, such as barium dihydrogen phosphate, barium hydrogen phosphate, tribarium phosphate, and barium hypophosphite; magnesium salts, such as magnesium monohydrogen phosphate, magnesium hydrogen phosphate, trimagnesium phosphate, and magnesium hypophosphite; calcium salts, such as calcium dihydrogen phosphate, calcium hydrogen phosphate, tricalcium phosphate, and calcium hypophosphite; and the like.

The polyphosphates are not particularly limited, and examples of polyphosphates include ammonium polyphosphate, piperazine polyphosphate, melamine polyphosphate, ammonium polyphosphate amide, aluminum polyphosphate, and the like.

Of these, because of the improvement in self-extinguishing capability of the phosphate-containing flame retardant, monophosphates are preferable for use, and ammonium dihydrogenphosphate is more preferable for use.

The phosphate-containing flame retardants may be used singly, or in a combination of two or more members.

The amount of the phosphate-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the phosphate-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

The bromine-containing flame retardants for use in the present invention are not particularly limited, as long as the retardants are compounds containing bromine in their molecular structure. Examples include aromatic brominated compounds.

Specific examples of aromatic brominated compounds include monomeric organic bromine compounds, such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis(pentabromophenoxy)ethane, ethylene-bis(tetrabromophthalimide), and tetrabromobisphenol A; brominated polycarbonates, such as polycarbonate oligomers prepared from brominated bisphenol A as a starting material, and copolymerized products of a polycarbonate oligomer and bisphenol A; brominated epoxy compounds, such as diepoxy compounds prepared by reacting brominated bisphenol A and epichlorohydrin, and monoepoxy compounds prepared by reacting a brominated phenol and epichlorohydrin; poly(brominated benzyl acrylate); brominated polyphenylene ethers; brominated bisphenol A, condensation products of cyanuric chloride and brominated phenol; brominated polystyrenes, such as brominated (polystyrene), poly(brominated styrene), and crosslinked brominated polystyrene; halogenated bromine compound polymers, such as crosslinked or non-crosslinked brominated poly(-methylstyrene); and the like.

From the standpoint of reducing the heat amount in the initial stage of burning, brominated polystyrene, hexabromobenzene, and the like are preferable, and hexabromobenzene is more preferable.

The bromine-containing flame retardants may be used singly, or in a combination of two or more.

The amount of the bromine-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the bromine-containing flame retardant is present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

Examples of the antimony-containing flame retardants for use in the present invention include antimony oxide, antimonate, pyroantimonate, and the like.

Examples of antimony oxide include antimony trioxide, antimony pentoxide, and the like.

Examples of antimonate include sodium antimonate, potassium antimonate, and the like.

Examples of pyroantimonate include sodium pyroantimonate, potassium pyroantimonate, and the like.

An antimony-containing flame retardant for use in the present invention is preferably antimony oxide.

The antimony-containing flame retardants may be used singly, or in a combination of two or more.

The amount of the antimony-containing flame retardant is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the antimony-containing flame retardant is present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

Examples of the metal hydroxides for use in the present invention include magnesium hydroxide, calcium hydroxide, aluminum hydroxide, iron hydroxide, nickel hydroxide, zirconium hydroxide, titanium hydroxide, copper hydroxide, vanadium hydroxide, tin hydroxide, and the like.

The metal hydroxides may be used singly, or in a combination of two or more.

The amount of the metal hydroxide, is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the foamable polyurethane composition, the metal hydroxide may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

The total amount of the flame retardant for use in the present invention is preferably 16 parts by mass to 260 parts by mass, more preferably 16 parts by mass to 149 parts by mass, and still more preferably 16 parts by mass to 112 parts by mass, per 100 parts by mass of the polyol. In the foamable polyurethane composition, the total amount of the flame retardant is 4.5 parts by mass to 70 parts by mass, more preferably 4.5 parts by mass to 40 parts by mass, and still more preferably 4.5 parts by mass to 30 parts by mass, per 100 parts by mass of the urethane resin.

When the total amount of the flame retardant is the lower limit or over, the dense residue formed by the heat of a fire in a molded article formed from the foamable polyurethane composition is prevented from breaking. When the total amount of the flame retardant is the upper limit or below, the foamable polyurethane composition forms an excellent foam.

8. Other Components

The composition according to the present invention may further contain an inorganic filler. The inorganic filler is not particularly limited, and examples include silica, diatomaceous earth, alumina, titanium oxide, calcium oxide, magnesium oxide, iron oxide, tin oxide, antimony oxide, ferrites, basic magnesium carbonate, calcium carbonate, magnesium carbonate, barium carbonate, dawsonite, hydrotalcite, calcium sulfate, barium sulfate, gypsum fiber, potassium salts, such as calcium silicate, talc, clay, mica, montmorillonite, bentonite, activated clay, sepiolite, imogolite, sericite, glass fiber, glass beads, silica balloon, aluminum nitride, boron nitride, silicon nitride, carbon black, graphite, carbon fiber, carbon balloon, charcoal powder, a range of metal powder, potassium titanate, magnesium sulfate, lead zirconate titanate, aluminum borate, molybdenum sulfide, silicon carbide, stainless fiber, a range of magnetic powder, slag fiber, fly ash, silica alumina fiber, alumina fiber, silica fiber, zirconia fiber, and the like. However, components corresponding to the "acicular fillers" mentioned above are excluded from "other components."

The inorganic fillers may be used singly, or in a combination of two or more.

The composition of the present invention may optionally contain an antioxidant, such as a phenol-based antioxidant, an amine-based antioxidant, and a sulfur-based antioxidant; auxiliary components, such as a heat stabilizer, a metal harm inhibitor, an antistatic agent, a stabilizer, a crosslinking agent, a lubricant, a softener, a pigment, and a tackifier resin; and a tackifier, such as polybutene and petroleum resin, as long as the object of the present invention is not impaired.

Since the foamable polyurethane composition containing components 1 to 8 described above undergoes a reaction and cures, the viscosity changes over time. Thus, before use, the foamable polyurethane composition is divided into two or more parts in order to prevent the foamable polyurethane composition from reacting and curing (foamable polyurethane premix composition). When the foamable polyurethane composition is used, the divided two or more parts of the foamable polyurethane composition is mixed to come together, thereby preparing a foamable polyurethane composition.

The foamable polyurethane composition should be divided into two or more parts in a manner such that each of the divided two or more parts of the foamable polyurethane composition does not independently begin to cure; and such that after the divided parts of the foamable polyurethane composition are mixed, a curing reaction begins.

The foamable polyurethane composition may be cured by mixing at room temperature, or each of the divided parts may be preheated before being mixed.

The catalyst, foam stabilizer, foaming agent, ammonium carboxylate, and optionally used other components such as a flame retardant may be mixed with either a polyol or a polyisocyanate, or added separately from the polyol and polyisocyanate. Preferably, the polyol, catalyst, foam stabilizer, foaming agent, ammonium carboxylate, and optionally used other components such as a flame retardant are provided as a polyol premix containing a polyol and these components (a polyol composition that is reacted with a polyisocyanate compound to prepare a polyurethane foam). The other components described in section 8 may be mixed with either a polyol or a polyisocyanate, or added separately from the polyol and polyisocyanate. The other components described in section 8 may be preferably contained in the polyol premix.

A foamable polyurethane composition prepared by mixing the polyol, polyisocyanate, catalyst, foam stabilizer, foaming agent, ammonium carboxylate, and other components such as a flame retardant foams and cures, thereby forming a polyurethane foam. The mixed components are preferably a polyisocyanate and a polyol premix containing a polyol, catalyst, foam stabilizer, foaming agent, ammonium carboxylate, and other components such as a flame retardant.

The use of the foamable polyurethane composition of the present invention is not particularly limited. For example, the foamable polyurethane composition of the present invention can be used for on-site spraying. In addition, the foamable polyurethane composition can be used for repairing foams used for heat insulation materials of vehicles or buildings. The foamable polyurethane composition can also be used for filling openings or gaps in buildings.

The term "buildings" as used herein includes any structures that are part of buildings, such as building structural materials for walls, ceilings, roofs, and floors; as well as fittings, such as windows (e.g., double sliding windows, casement windows, and double-hung windows), shoji (Japanese sliding windows or doors), tobira (i.e., doors), to (Japanese doors), fusuma (Japanese sliding doors), and transoms. The term "openings" refers to any openings found in a building, including joints between the structural materials of a building, and holes in one structural material. Among the openings, a "gap" refers to an opening found between two opposing components or portions, such as those between a structural material and a structural material, between a structural material and a fitting, between a fitting and a fitting, and between a structural material or a fitting and furniture (e.g., a kitchen sink).

The polyurethane foam obtained by foaming and curing the foamable polyurethane composition is excellent in waterproofness and airtightness. Thus, the polyurethane foam can effectively prevent water etc. from entering through openings or gaps in buildings. When the composition of the present invention contains a flame retardant, excellent flame retardancy can be imparted to the polyurethane foam. In this case, the composition can effectively prevent smoke, flames, and gas generated by combustion from entering through openings or gaps in buildings.

The foamable polyurethane composition of the present invention is used for on-site spraying, in which the composition is sprayed to a substrate on-site, thus forming a foam for the purpose of repairing slight openings or gaps on-site without using large-scale equipment such as an aerosol.

In the on-site spraying method, the foamable polyurethane composition can be divided into two or more parts. Specifically, the composition is divided into two or more components (can be referred to as the "first solution," "second solution," or the like) in a manner such that each of the divided parts does not independently start curing; and such that a curing reaction starts after the divided parts are mixed.

On-site spraying can be carried out by using a spraying device (produced by Graco Inc.: A-25) and a spray gun (produced by Gusmer: D gun). On-site spraying can be performed as follows. The temperatures of components (e.g., the first solution and the second solution) in different containers, the components being obtained by dividing a foamable polyurethane composition, are adjusted in a spraying device. The components are subjected to collisional mixing at the end of the spray gun, and the mixture is formed into mist by air pressure. The spraying device and the spray gun are known, and commercially available products thereof can be used.

On-site spraying can be also performed using a cartridge gun, discharging device, or the like. In on-site spraying, when the foamable polyurethane composition is divided into the first solution and the second solution, a two-solution mixed container in which the first solution and the second solution are contained in different containers, or a two-solution mixed container in which the first solution and the second solution are contained in a single container, can both be used. The mixed container can be used in combination with a stirrer and the aforementioned device, as necessary. The cartridge gun is also known, and a commercially available product thereof can be used.

On-site spraying can be performed on any substrates (structural materials). Examples of substrates include metal (e.g., stainless steel), cement plates, concretes, gypsum boards, and the like.

The thickness (sprayed thickness) of the foamable urethane resin composition sprayed to a substrate is not particularly limited. The sprayed thickness is 1 to 100 mm, preferably 10 to 100 mm, and even more preferably 15 to 100 mm.

The on-site spraying method includes the step of spraying the foamable polyurethane composition to a substrate (structural material). Preferably, the on-site spraying method includes the step of mixing, on-site, parts that are divided from the foamable polyurethane composition and contained in different containers.

The foamable urethane resin composition sprayed to a substrate foams and cures; and adheres to the substrate, thus forming a laminate structure.

The following Examples describe the present invention in more detail. However, the present invention is not limited to these Examples.

EXAMPLES

The following Examples describe the present invention in more detail. However, the present invention is not limited to these Examples.
1. Production of Foamable Polyurethane Composition and its Foam In accordance with the formulations shown in Table 1, foamable polyurethane compositions of the Examples and Comparative Examples were prepared in two separate parts: (1) a polyol premix and (2) a polyisocyanate. The following are the details of each component in the table.
(1) Polyol Premix
  Polyol
p-phthalic acid polyester polyol (produced by Kawasaki Kasei Chemicals Ltd., trade name: Maximol RLK-087, hydroxy value: 200 mg KOH/g)
  Foam Stabilizer
Polyalkyleneglycol-based foam stabilizer (produced by Dow Corning Toray Co., Ltd., trade name: SH-193)
  Ammonium carboxylate
A trimerization catalyst (produced by Air Products and Chemicals, Inc., trade name: DABCO TMR7)

Catalyst
A trimerization amine catalyst (produced by Tosoh Corporation, trade name: TOYOCAT®-TRX)
A trimerization amine catalyst (produced by San-Apro Ltd., trade name: U-CAT 18X)
A trimerization metal catalyst (produced by Air Products and Chemicals, Inc., trade name: DABCO K-15)
A resinifying amine catalyst (produced by San-Apro Ltd., trade name: U-CAT 202)
A resinifying amine catalyst (produced by Tosoh Corporation, trade name: TOYOCAT®-TT)
A resinifying amine catalyst (produced by Tosoh Corporation, trade name: TOYOCAT®-DM70)
A resinifying metal catalyst (produced by Nitto Kasei Co., Ltd., Neostann U-600)
A resinifying metal catalyst (produced by Nitto Kasei Co., Ltd., Neostann U-830)

Foaming Agent
Water
HFO (produced by Honeywell Inc., trade name: Solstice LBA)

Flame Retardant
Tris(β-chloropropyl)phosphate (produced by Daihachi Chemical Industry Co., Ltd., trade name: TMCPP, "TMCPP")
Red phosphorus (produced by Rin Kagaku Kogyo Co., Ltd., trade name: Nova Excel 140)
Zinc borate (produced by Hayakawa & Co., Ltd., trade name: Firebrake ZB)
Wollastonite ($SiO_2 \cdot CaO$) (produced by Kansai Matec Co., Ltd., trade name: SH-1250)

In accordance with the formulations shown in Table 1, (1) components of a polyol premix were weighed and placed in a 1000-mL polypropylene beaker, and mixed and stirred by hand at 25° C. for 1 minute.

A foam was formed according to the following procedure. (2) Polyisocyanate was added to (1) the kneaded product of the components of the polyol premix, and stirred with a hand-held mixer for about 10 seconds, thereby preparing a foamable polyurethane resin composition. The obtained polyurethane resin composition lost its flowability over time, thereby giving a foam of foamable polyurethane resin composition (each component ratio was represented by part by mass per 100 parts by mass of the urethane resin).

2. Evaluation

The Examples were evaluated according to the following criteria.

Evaluation of Lateral Extension Peeling

Remarkable lateral extension during foaming generates peeling at a substrate interface when spray application is performed on a concave-convex portion. By performing spray application on the concave portion of a L-shaped substrate, lateral extension was evaluated according to the presence or absence of peeling. As the L-shaped substrate, two perpendicularly fixed gypsum boards (30 cm×30 cm) were used. For spraying, an H-25 spray device produced by Graco Inc., was used.

Peeling occurred when spraying was performed on the concave portion of the L-shaped substrate: remarkable lateral extension, bad.

Peeling did not occur when spraying was performed on the concave portion of the L-shaped substrate: slight lateral extension, good.

Evaluation of HFO/Catalytic Decomposition Properties

When the decomposition reaction between HFO and the catalyst occurs, the activity of the catalyst reduces, which changes foaming behavior. A polyol premix was subjected to an accelerated test at 60° C. for a week, and the foaming behavior difference before and after the accelerated test was evaluated according to the tack-free time.

The change in the tack-free time before and after the accelerated test was 30% or more: change in foaming behavior, bad.

The change in the tack-free time before and after the accelerated test was less than 30%: no change in foaming behavior, good.

Table 1 shows the results.

| | | | | Ex. 1 | Ex. 2 | Ex. 3 | Ex. 4 | Ex. 5 | Ex. 6 | Ex. 7 |
|---|---|---|---|---|---|---|---|---|---|---|
| Formulation | Isocyanate | PM200 | Nanhua Chemical Group Co., Ltd. | 73.2 | 63.8 | 63.8 | 63.8 | 63.8 | 73.2 | 73.2 |
| | Polyol | RLK-087 | Kawasaki Kasai Chemicals Ltd. | 26.7 | 36.2 | 36.2 | 36.2 | 36.2 | 26.7 | 26.7 |
| | Foam stabilizer | SH-193 | Dow Corning Toray Co., Ltd. | 1.9 | 1.9 | 1.9 | 1.9 | 1.9 | 1.9 | 1.9 |
| | Ammonium carboxylate | DABCO TMR7 | Air Products and Chemicals, Inc. | 2.7 | 2.7 | 2.7 | 1.8 | 3.6 | 3.6 | 5.4 |
| | Catalyst | TOYOCAT-TRX | Tosch Corporation | | | | | | | |
| | | U-CAT 18X | San-Apro Ltd. | | | | | | | |
| | | DABCO K-15 | Air Products and Chemicals, Inc. | 2.7 | 2.7 | 2.7 | 2.5 | | | |
| | | TOYOCAT-TT | Tosch Corporation | | | | | | | |
| | | U-CAT 202 | San-Apro Ltd. | | | | | | | |
| | | TOYOCAT-DM70 | Tosch Corporation | | | | | | | |
| | | Neostann U-600 | Nitto Kasei Co., Ltd. | 0.4 | 0.4 | | 0.4 | 0.4 | 0.4 | 0.4 |
| | | Neostann U-830 | Nitto Kasei Co., Ltd. | | | 0.4 | | | | |
| | Foaming agent | Water | — | 0.2 | 0.2 | 0.2 | 0.2 | 0.2 | 0.2 | 0.2 |
| | | HFO | Honeywell Inc. | 15.0 | 15.0 | 15.0 | 15.0 | 15.0 | 15.0 | 15.0 |
| | Flame retardant | TMCPP | Dainachi Chemical Industry Co., Ltd. | | | | | | | |
| | | Nova Excel 100 | Rin Kagaku Kogyo Co., Ltd. | | | | | | | |
| | | FIRE BREAK 3B (zinc borate) | | | | | | | | |
| | | SH-1250 | Kansai Matec Co., Ltd. | | | | | | | |

-continued

| Evaluation | Change in foaming behavior before and after test at 60° C. for one weak | good | good | good | good | good | good | good |
|---|---|---|---|---|---|---|---|---|
| | Lateral extension peeling | good | good | good | good | good | good | good |
| | Isocyanate index | 450 | 300 | 300 | 300 | 300 | 450 | 450 |

| | | | | Ex. 8 | Comp. Ex. 1 | Comp. Ex. 2 | Comp. Ex. 3 | Comp. Ex. 4 |
|---|---|---|---|---|---|---|---|---|
| Formulation | Isocyanate | PM200 | Nanhua Chemical Group Co., Ltd. | 73.2 | 63.8 | 63.8 | 63.8 | 73.2 |
| | Polyol | RLK-087 | Kawasaki Kasai Chemicals Ltd. | 26.7 | 36.2 | 36.2 | 36.2 | 26.7 |
| | Foam stabilizer | SH-193 | Dow Corning Toray Co., Ltd. | 1.9 | 1.9 | 1.9 | 1.9 | 1.9 |
| | Ammonium carboxylate | DABCO TMR7 | Air Products and Chemicals, Inc. | 2.7 | | | | |
| | Catalyst | TOYOCAT-TRX | Tosch Corporation | | 1.4 | 1.4 | | 1.4 |
| | | U-CAT 18X | San-Apro Ltd. | | 1.0 | | | |
| | | DABCO K-15 | Air Products and Chemicals, Inc. | 2.7 | | 1.0 | 5.4 | 1.0 |
| | | TOYOCAT-TT | Tosch Corporation | | | 1.0 | 1.0 | |
| | | U-CAT 202 | San-Apro Ltd. | | | | | 1.0 |
| | | TOYOCAT-DM70 | Tosch Corporation | | 2.4 | 2.4 | | 2.4 |
| | | Neostann U-600 | Nitto Kasei Co., Ltd. | 0.4 | | | 0.4 | |
| | | Neostann U-830 | Nitto Kasei Co., Ltd. | | | | | |
| | Foaming agent | Water | — | 0.2 | 0.2 | 0.2 | 0.2 | 0.2 |
| | | HFO | Honeywell Inc. | 15.0 | 15.0 | 15.0 | 15.0 | 15.0 |
| | Flame retardant | TMCPP | Dainachi Chemical Industry Co., Ltd. | 12.0 | | | | |
| | | Nova Excel 100 | Rin Kagaku Kogyo Co., Ltd. | 8.0 | | | | |
| | | FIRE BREAK 3B (zinc borate) | | 3.0 | | | | |
| | | SH-1250 | Kansai Matec Co., Ltd. | 3.5 | | | | |
| Evaluation | Change in foaming behavior before and after test at 60° C. for one weak | | | good | bad | bad | good | bad |
| | Lateral extension peeling | | | good | good | good | bad | good |
| | Isocyanate index | | | 450 | 300 | 300 | 300 | 450 |

The invention claimed is:

1. A polyol composition for obtaining a polyurethane foam through a reaction with a polyisocyanate compound, the polyol composition comprising:
    a polyol;
    at least one ammonium carboxylate present in a total amount of 3 to 23 parts by mass per 100 parts by mass of the polyol;
    at least one resinifying catalyst present in a total amount of 0.13 to 7.5 parts by mass per 100 parts by mass of the polyol;
    optionally at least one trimerization catalyst present in a total amount of up to 25.0 parts by mass per 100 parts by mass of the polyol;
    a foam stabilizer; and
    a hydrofluoroolefin (HFO) foaming agent;
    wherein the at least one ammonium carboxylate has, as a cationic moiety, a quaternary ammonium cation, and as an anionic moiety, a carboxylic acid anion represented by formula (1):

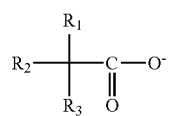

(1)

wherein $R_1$ is $C_nH_{2n+1}$; $R_2$ is $C_mH_{2m+1}$; $R_3$ is a hydrogen atom or $C_lH_{2l+1}$; and n, m, and l are each independently an integer of 1 or more; and
    wherein the at least one resinifying catalyst comprises an organic acid bismuth salt.

2. The polyol composition according to claim 1, wherein the at least one ammonium carboxylate is present in a total amount of 5 to 17 parts by mass to per 100 parts by mass of the polyol.

3. The polyol composition according to claim 1, wherein $R_3$ is $C_lH_{2l+1}$.

4. The polyol composition according to claim 1, wherein the cationic moiety of the at least one ammonium carboxylate is a tetramethyl ammonium cation.

5. The polyol composition according to claim 1, wherein the anionic moiety of the at least one ammonium carboxylate is 2,2-dimethylpropanoic acid anion.

6. The polyol composition according to claim 1, wherein the at least one trimerization catalyst is present and comprises an organic acid potassium salt.

7. A foamable polyurethane composition, which is a mixture of the polyol composition according to claim 1 and a polyisocyanate compound.

8. The foamable polyurethane composition according to claim 7, wherein the foamable polyurethane composition has an isocyanate index of 250 or more.

9. A polyurethane foam obtained by curing the foamable polyurethane composition according to claim 7.

* * * * *